J. S. MARSH.
CULTIVATOR.
APPLICATION FILED SEPT. 26, 1911.
1,068,513.
Patented July 29, 1913.
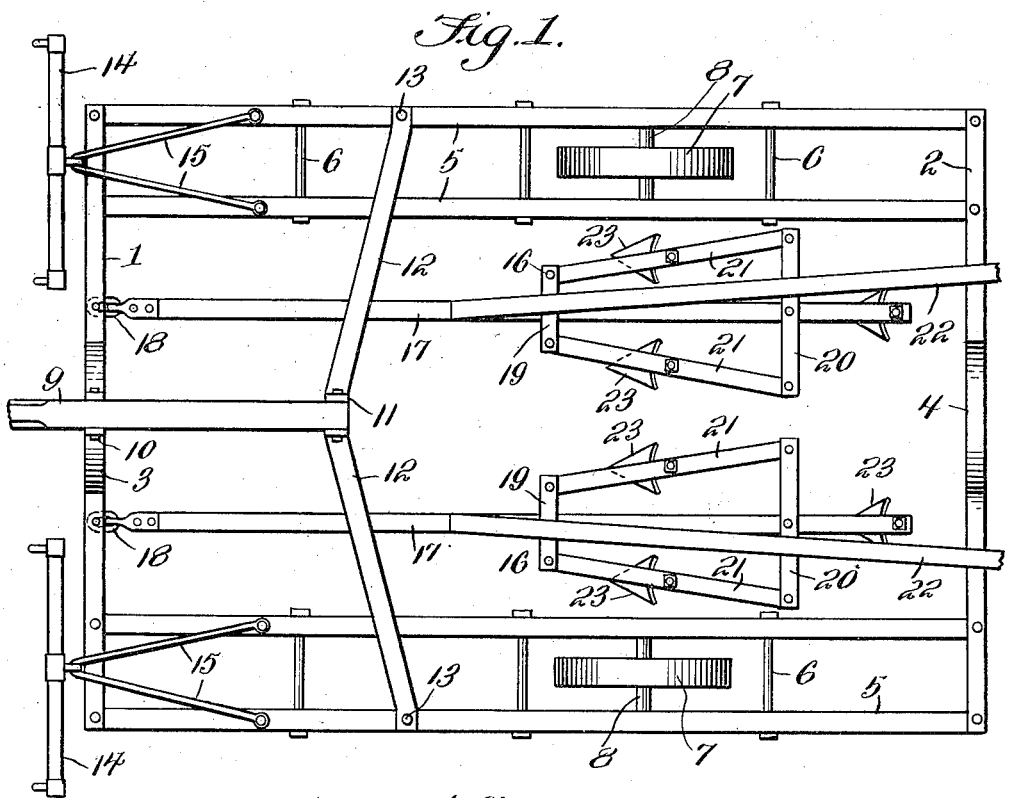
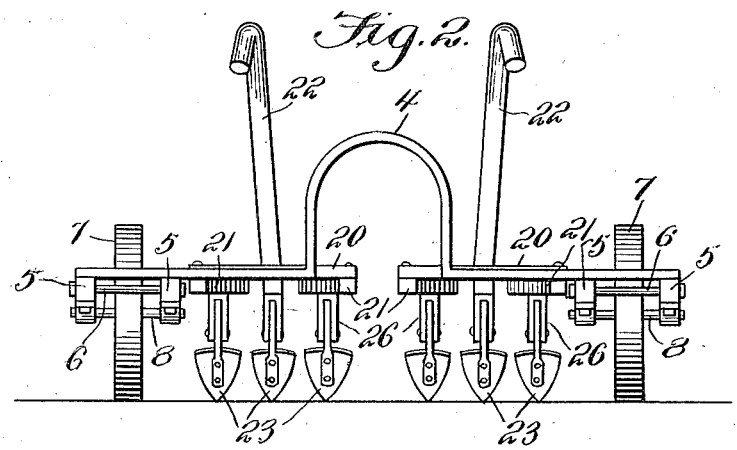
Witnesses
J. T. L. Wright
Inventor
James S. Marsh
By
Attorney

UNITED STATES PATENT OFFICE.

JAMES S. MARSH, OF QUINCY, ILLINOIS.

CULTIVATOR.

1,068,513.  Specification of Letters Patent.  Patented July 29, 1913.

Application filed September 26, 1911. Serial No. 651,321.

*To all whom it may concern:*

Be it known that I, JAMES S. MARSH, a citizen of the United States, residing at Quincy, in the county of Adams and State of Illinois, have invented certain new and useful Improvements in Cultivators, of which the following is a specification.

My present invention has to do with cultivators of the double or twin type such as are ordinarily drawn by two horses.

One of the objects of the invention is to provide a cultivator, of the kind stated, that is wheel-supported and is so constructed and arranged that the draft on the horses is rendered very light, and the cultivator members may be freely adjusted vertically and laterally in the wheel-supported frame without being interfered with by the means provided for the attachment of the draft horses.

Another object of the invention is the provision of a construction in which the shanks of the cultivator shovels are connected with the frames of the cultivator members in such manner that said shovels are enabled of themselves to freely clear any obstruction encountered and are then returned to and yieldingly retained in their normal working positions.

Another object is the provision of a cultivator construction that is well adapted to withstand the rough usage and exposure to which cultivators are ordinarily subjected, and is, at the same time, capable of being readily repaired at an ordinary blacksmith's shop when occasion demands.

With the foregoing in mind, the invention will be fully understood from the following description and claim when the same are read in connection with the drawings, accompanying and forming part of this specification, in which:

Figure 1 is a plan of the best practical embodiment of my invention that I have as yet devised. Fig. 2 is a rear elevation of the same.

Similar numerals of reference designate corresponding parts in all of views of the drawings.

The main frame of my novel cultivator is made up of front and rear cross bars 1 and 2 having arches 3 and 4, respectively, and opposite pairs of longitudinal or side bars 5. The bars 5 of each pair are spaced apart, and are braced and strengthened by transverse bolts 6.

Between the bars 5 of each pair is disposed a supporting or ground wheel 7; the same being fixed on a spindle 8 which, in turn, is journaled at its ends in bearings carried by the bars 5. This manner of disposing the supporting or ground wheels is simple, inexpensive and durable, and is also materially advantageous because it leaves all of the space intermediate the inner bars 5 free of obstruction for the free manipulation of the cultivator members hereinafter set forth.

As clearly shown the tongue 9 of the cultivator is connected at 10 to the arch 3 of the front frame bar 1, and at 11, to brace bars 12 that extend to points intermediate the middles and forward ends of the outer bars 5 where they are connected to said bars, as indicated by 13. By virtue of this construction the draft animals are enabled to balance the cultivator and assume the same running lightly, and, at the same time, the rear connections or braces 12 of the tongue are so disposed as not to interfere in any measure with the hereinafter mentioned manipulations of the cultivator members.

Swingletrees 14 for the attachment of the draft animals are disposed immediately in front of the forward frame bar 1, and each of the said swingletrees is connected through rearwardly divergent bars 15 with the adjacent longitudinal frame bars 5. This is advantageous inasmuch as the draft animals are connected with the main frame at points adjacent the cultivator shovels, which conduces to lightness of draft.

Each of the cultivator members, which are numbered 16, comprises a longitudinal frame bar 17, connected through a universal joint 18 with the forward bar 1 of the main frame, forward and rear transverse frame bars 19 and 20 fixed on said bar 17, frame bars 21 extending between and fixedly connected to the ends of the bars 19 and 20, a handle 22 fixed to the bar 17 at a point well in advance of the forward transverse bar 19 and extending rearward and upward from the point of connection, and shovels 23 of which there are, by preference, one at the rear of the bar 17 and one on each bar 21. The shovels are identical in construction and are similarly connected with their respective frame bars. The shank 24 of the shovel referred to is pivoted, at 25, to swing vertically in a bifurcated hanger 26, and on the said hanger is a pivot post 27 that is journaled in the bar and is held thereto by suitable means such as a nut 28. The pivotal connection of the shank 24 is at an intermediate point in the length thereof, and between the upper arm of the shank and a point on the bar in rear of the shank is interposed a tractile spring connection 29. In this connection it will be observed that the capacity of the hanger 26 to turn in the bar by which it is carried, and the adaptability of the shank 24 to be swung against the action of the spring 29 enables the cultivator shovel to clear any ordinary obstruction that may be in its path, and it will also be observed that immediately after the obstruction is cleared, the spring 29 will operate to turn the hanger 26 and swing the shank 24 back to the positions illustrated and yieldingly maintain the said elements in the said positions so as to hold the cultivator shovel to its work. It will further be appreciated that the described mode of connecting the cultivator shovel with its respective frame bar is simple and embodies no delicate parts such as are liable to get out of order after a short period of use.

While I have elected to show the two cultivator members 16 as side by side throughout their length, I would have it understood that in the discretion of the manufacturer either member may be extended rearwardly beyond the other. This latter arrangement I have deemed it unnecessary to illustrate as it is the full equivalent of the arrangement shown.

The tongue 9 is preferably detachable so that the cultivator can be used without the same when it is desirable so to do. It will be noticed, however, that whether or no the tongue is employed, the draft animals will be in line of the wheels with the result that the cultivator will be drawn in a straight course and will not be liable to move from side to side.

I claim:

In a cultivator, the combination of a main rectangular frame having side, front and rear members disposed in horizontal alinement, bearing wheels supporting said frame in close proximity to the ground, straight shovel frame bars horizontally disposed inside of and in horizontal alinement with said main frame and loosely connected with the front member thereof at the forward ends of said bars with the free rear ends trailing behind the points of connection, each bar having a trapezoidal shovel carrying frame near its rear end, and a handle bar attached to each shovel bar and projecting upwardly therefrom and rearwardly of said main frame, said main frame being upwardly and centrally arched forwardly and rearwardly thereof, substantially as and for the purposes set forth.

In testimony whereof I affix my signature in presence of two witnesses.

JAMES S. MARSH.

Witnesses:
ROBERT C. ALLEN,
JOHN F. GARNER.

---

Copies of this patent may be obtained for five cents each, by addressing the "Commissioner of Patents, Washington, D. C."